United States Patent
Khosravi et al.

(10) Patent No.: US 7,467,285 B2
(45) Date of Patent: Dec. 16, 2008

(54) MAINTAINING SHADOW PAGE TABLES IN A SEQUESTERED MEMORY REGION

(75) Inventors: Hormuzd M. Khosravi, Portland, OR (US); Uday Savagaonkar, Beaverton, OR (US); Ravi Sahita, Beaverton, OR (US); Priya Rajagopal, Wharton, NJ (US)

(73) Assignee: Intel Corporation, Santa Clara, CA (US)

( * ) Notice: Subject to any disclaimer, the term of this patent is extended or adjusted under 35 U.S.C. 154(b) by 172 days.

(21) Appl. No.: 11/191,468

(22) Filed: Jul. 27, 2005

(65) Prior Publication Data
US 2007/0028074 A1    Feb. 1, 2007

(51) Int. Cl.
*G06F 12/00*  (2006.01)
(52) U.S. Cl. ............. 711/206; 711/207; 718/1; 726/4; 726/17; 726/26; 726/30
(58) Field of Classification Search ........ None
See application file for complete search history.

(56) References Cited

U.S. PATENT DOCUMENTS
2003/0105935 A1*  6/2003  Moore ............... 711/171

OTHER PUBLICATIONS
Barham et al. "Xen and the Art of Virtualization". 2003. ACM Press. Proceedings of the nineteenth ACM symposium on Operating systems principles, pp. 164-177.*

* cited by examiner

*Primary Examiner*—Hyung S Sough
*Assistant Examiner*—Kaushikkumar Patel
(74) *Attorney, Agent, or Firm*—Konrad Raynes & Victor LLP; David W. Victor (57) ABSTRACT

Provided are a method, system, program and device for maintaining shadow page tables in a sequestered memory region. A first processor executing an application invokes a second processor to create a shadow page table used for address translation for the application in a sequestered memory region non-alterable by processes controlled by an operating system executed by the first processor. The shadow page table references at least one page in an operating system memory region accessible to processes controlled by the operating system.

28 Claims, 5 Drawing Sheets

MAINTAINING SHADOW PAGE TABLES IN A SEQUESTERED MEMORY REGION

BACKGROUND

Malicious code, known as malware, which includes viruses, worms, adware, etc., may attack core components of the operating system to compromise key applications, including critical applications that operate in the operating system kernel, such as security, firewall and anti-virus agents. One concern is that malware may attack page tables maintained by the operating system to perform address translation for critical security applications. The malware may modify the references in the page table to point to pages of the malware code that when invoked by the security agent performs malicious operations.

Figure 1:
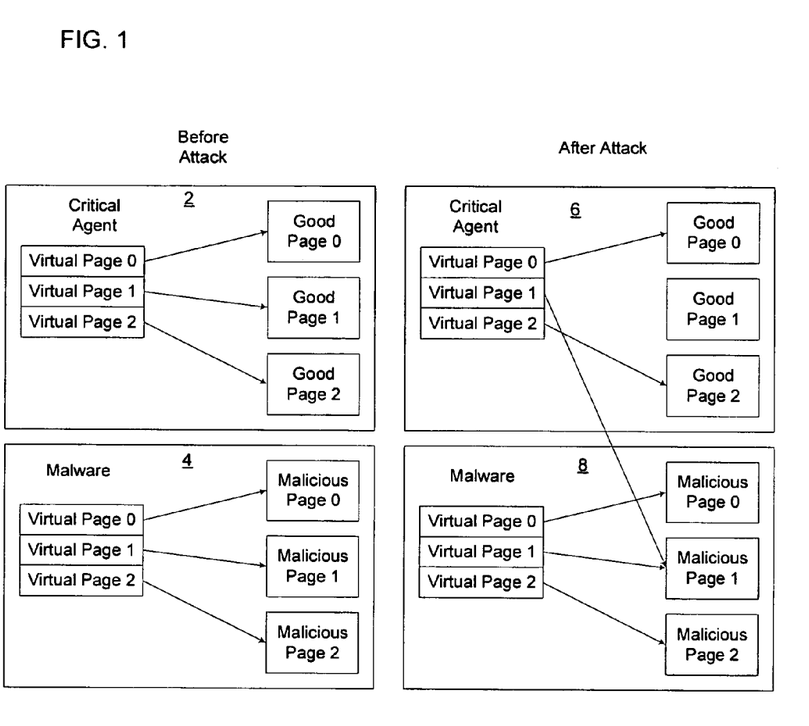
FIG. 1 illustrates how a malware attack on critical agent page table unfolds.

FIG. 1, panel 2 shows that prior to the attack, the critical agent, e.g., security or anti-virus application, references good pages of critical agent code. Panel 4 shows that prior to the attack the malware application page tables reference malicious pages of malicious malware code. Panel 6 shows that after the attack, the critical agent's page tables are modified to point to malicious pages. By referencing the malware page as shown in panels 6 and 8, address translation for the critical agent may cause the critical agent to execute the malware code in malicious page 1, panel 8. The executed malware code may provide the malware access to critical agent data structures to allow the malware to orchestrate a malicious attack on the system.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 2:
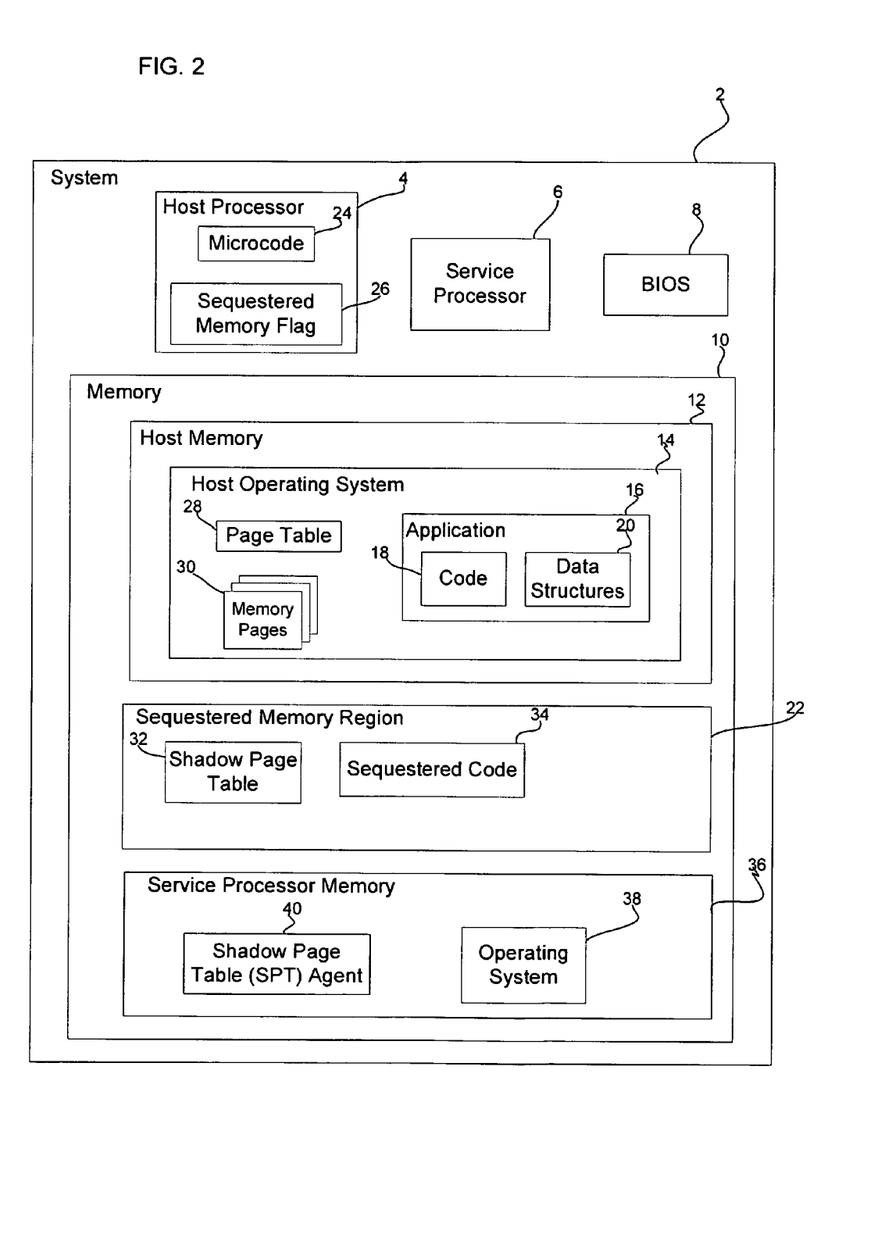
FIG. 2 illustrates an embodiment of a computing environment.

FIG. 2 illustrates a computing environment used with the described embodiments. A computer 2 includes a host processor 4 and service processor 6. The host processor 4 includes microcode 24 implementing the host processor 4 platform and architecture. The host 4 and service 6 processors may be implemented in separate processor devices. For instance, the host processor 4 may be implemented in a central processing unit (CPU) and the service processor 6 may be implemented in a chipset, comprising one or more integrated circuit devices. The chipset in which service processor 6 may be implemented may be directly attached to the motherboard or implemented on an expansion card. Alternatively, the host 4 and service 6 processors may be implemented on separate CPU devices. Still further, the host 4 and service 6 processors may be implemented as separate virtual machines implemented in a single processor device. Virtual machines may be implemented in a single processor device using a virtualization monitor.

The host 4 and service 6 processors execute different operating systems 14 and 38, respectively, and maintain separate operating system data structures to independently execute applications and perform operations. The computer 2 further includes a basic input/output system (BIOS) 8 including code executed by the host processor 4 to initialize and control various computer 2 components (e.g., the keyboard, display screen, disk drives, serial communications, etc.) during a boot sequence. The BIOS 8 may be implemented in firmware in a non-volatile memory device on the computer 2 motherboard, such as a Flash memory, Read Only Memory (ROM), Programmable ROM (PROM), etc. The BIOS 8 code indicates the sequence of the boot operations.

The computer 2 includes a memory 10, comprising one or more memory devices, configured to include a host memory 12 in which an operating system 14 executed by the host processor 4 is loaded. One or more applications 16, having application code 18 and data structures 20, are loaded into the operating system 14 environment implemented in the host memory 12 to execute. In certain embodiments, the applications 16 may include device drivers loaded in the kernel space of the operating system 14. The operating system 14 may comprise an operating system known in the art, such as a Microsoft® Windows® operating system, Linux™, etc. (Microsoft and Windows are registered trademarks of Microsoft Corporation and Linux is a trademark of Linus Torvalds).

During initialization, the BIOS 8 may configure a sequestered memory region 22 that is inaccessible to processes controlled by the operating system 14, but is accessible to the operating system 38 and applications 40 executed by the service processor 6.

Page tables 28 in the host memory 12 are created for the application 16. Page tables 28 have entries for virtual addresses used by the application 16 that map to physical addresses referencing physical locations in pages 30 in the host memory 12. Page tables 28 in the host memory 12 are accessible to the operating system 14 and applications 16 executing therein. Additionally, shadow page tables 32 are created for the application 16 in the sequestered memory region 22 having entries for virtual addresses that map to physical addresses referencing locations in pages 30 in the host memory 12.

A sequestered memory flag 26 implemented in the host processor 4 platform, such as the host processor 4 circuitry or chipset, indicates whether the host processor 4 may access the sequestered memory region 22. In normal operating mode, the host processor 4 and applications 16 running in the host memory 12 do not access the sequestered memory region 22. However, while performing address translations using shadow page tables 32, the host processor 4 requires access to the sequestered memory region 22 which hosts the shadow page tables 32. For the duration of such access, the host processor 4 configures the sequestered memory flag 26 to enable access to the sequestered memory region 22. Once the address translations using the shadow page tables 32 complete, the flag 26 is set to disable host processor 4 access to the sequestered memory region 22.

The sequestered memory region 22 may further include sequestered code 34 loaded into the sequestered memory region 22 by the BIOS 8 during the boot sequence that is inaccessible to processes operating under the operating system 14. This sequestered code 34 comprises code associated with the sequestered memory region 22 and may comprise special firmware code that may be executed in a special operating mode, i.e., sequestered mode, of the processor platform in which the host processor 4 process has exclusive access to all of platform hardware resources. In other words, this sequestered operating mode of the platform provides an isolated environment independent of the host operating system 14.

In certain embodiments, the host processor 4 may execute a special interrupt, which instruction is recognized by the host processor 4 platform and causes the host processor 4 to save the host processor 4 state information and enter the sequestered mode to execute the sequestered code 34 loaded by the BIOS 8 in the sequestered memory region 22. Upon processing the special interrupt, the host processor 4 executes special handlers to execute the sequestered code 34 to perform various system management operations.

In one embodiment, the sequestered code 34 may comprise System Management Mode (SMM) code included in Intel Corporation's ("Intel") processor architecture. On Intel architectures, the sequestered operating mode is referred to as System Management Mode (SMM) and the special interrupt to invoke the SMI mode is referred to as a System Management Interrupt (SMI). Further details of the SMM mode are described in the publication from Intel entitled "Intel Architecture Software Developer's Manual, Volume 3: System Programming" (Copyright Intel, 1999). In additional embodiments, the sequestered mode, sequestered code 34, and special interrupt may be implemented in processor architectures from different processor vendors.

The memory 10 may further implement a service processor memory region 36 accessible to the service processor 6, but not to the host processor 4. The service processor 6 executes an operating system 38. The service processor 6 may execute a shadow page table agent 40 that manages shadow page tables 32 in the sequestered memory region 22 for the host applications 16. In one embodiment, the service processor 6 has access to the sequestered memory region 22.

References in FIG. 2 to single instances of certain components, such as the page table 28, application 16, memory pages 30, shadow page table 32, etc. may refer to multiple instances of these components.

Figure 3:
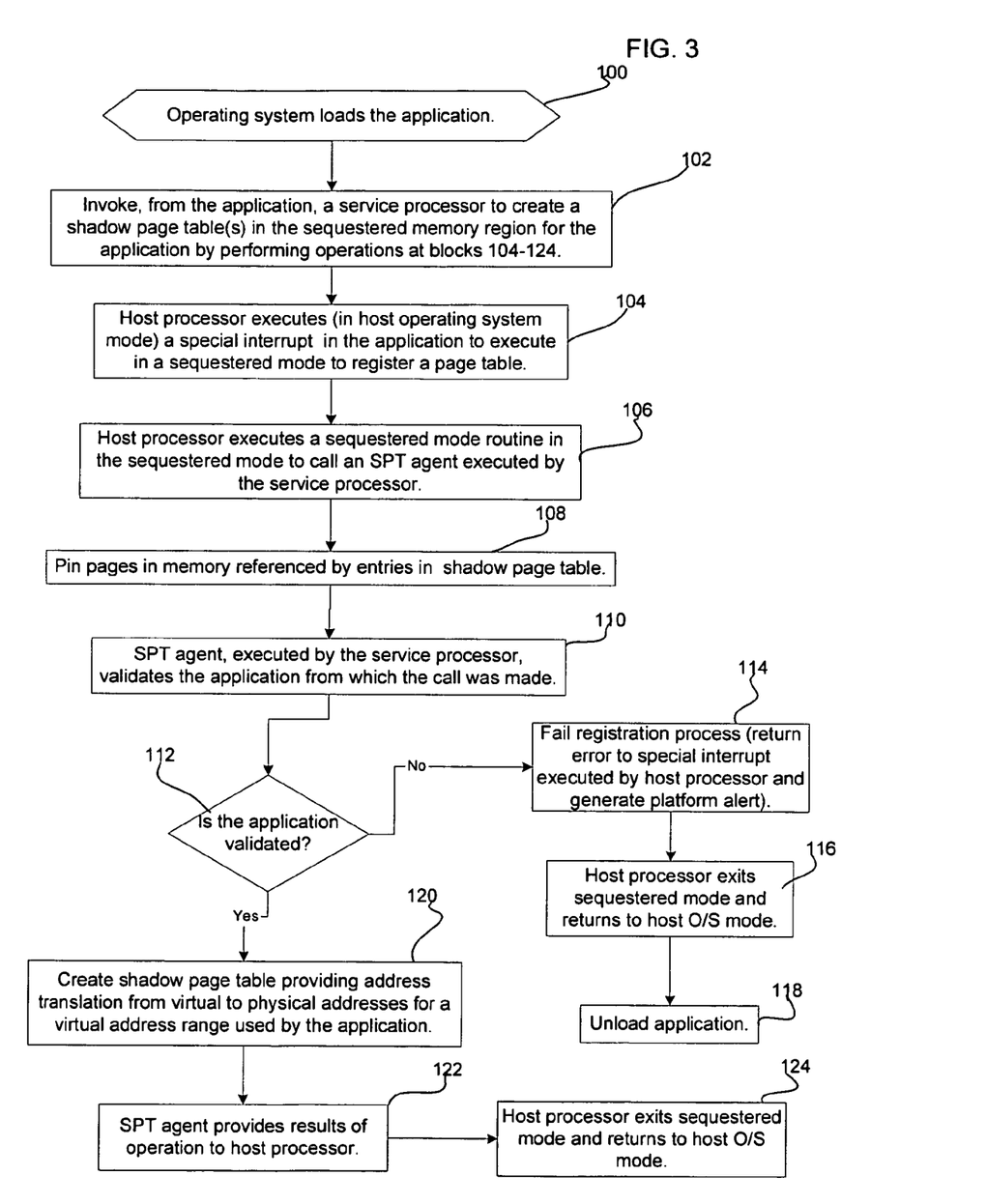
FIG. 3 illustrates an embodiment of operations to register a shadow page table in the sequestered memory region.

FIG. 3 illustrates operations to implement an address translation table for the application 16 as a shadow page table 32 in the sequestered memory region 22. Control begins at block 100 with the host processor 4 executing the host operating system 14 to load the application 16. The host processor 4 executes code in the application 16 to invoke (at block 102) a second processor, e.g., service processor 6, to create shadow page table(s) 32 in the sequestered memory region 22 for the application 16. The developer of the application 16 may include code to create shadow page tables 32 in the sequestered memory region 22 to use for address translation. Blocks 104 through 122 provide an embodiment of how the service processor 6 is invoked to create shadow page tables 32. While executing the application 16, the host processor 4 executes (at block 104) the special interrupt (which in an Intel SMM embodiment, comprises an SMI interrupt) to cause the host processor 4 to execute in the sequestered mode, e.g., service management mode (SMM), to register a shadow page table 32. Other programming techniques may be used to cause the host processor 4 to execute in sequestered mode. As discussed, in this sequestered mode, the host processor 4 does not execute the loaded operating system 14 code (which is executed when operating in the operating system mode), but instead executes the sequestered code 34 (to execute in the sequestered or second mode) which may have been loaded into the sequestered memory region 22 during system initialization. The sequestered memory region 22 is inaccessible to the operating system 14. The host processor 4 may execute (at block 106) a sequestered mode routine, which is part of the special interrupt handler, to call a shadow page table (SPT) agent 40 executed by the service processor 6.

The SPT agent 40, executed by the service processor 6, may pin (at block 108) the memory pages 30 in the host memory 12 referenced by the entries in the shadow page table 32. Pinning the memory pages 30 in the host memory 12 prevents the pages from being swapped to disk. Further, when pinning the memory pages 30, the pinned memory pages 30 are not moved once allocated and the shadow page table 32 protects those pinned pages 30. The SPT agent 40 further validates (at block 110) the application 16 from which the call to register shadow page tables 32 was made. To validate the application 16, the SPT agent 40 may determine whether the application 16 is indicated in a list as an acceptable application type or whether the application 16 is indicated in a list indicating malicious application types which are not permitted to register shadow page tables 32. Alternatively, the application 16 may be digitally signed by a trusted entity, indicating that the application 16 is allowed to register with the SPT agent 40. In one embodiment, the call to register the shadow page tables 32, e.g., the special interrupt, may indicate the location of the application 16 in host physical memory 12 to provide to the service processor 6. To verify the image and validate the application 16, the SPT agent 40 may scan the image of the application 16 at the location indicated in the call and compute a hash of the image to compare with pre-configured hashes of acceptable images.

If (at block 112) the application 16 from which the call was made to register shadow page tables 32 is not validated, then the SPT agent 40 fails (at block 114) the registration process, which may involve returning an error to the special interrupt executed by first processor and generate a platform alert. The host processor 4 exits (at block 116) the sequestered mode and returns to host operating system mode to execute the host operating system 14 code and application code 16. The host processor 4 may exit the sequestered mode by executing an exit instruction. In SMM embodiments, the exit instruction may comprise the RESUME (RSM) instruction executed in the system management mode (SMM). Upon exiting the sequestered mode in the event of a failure, the host processor 4 unloads (at block 118) the application 16. Further, the pinned memory pages may be unpinned.

If (at block 112) the application 16 registering the shadow page table 32 is validated, then the SPT agent 40 creates (at block 120) the shadow page table 32 to provide address translation from virtual to physical addresses for a virtual address range used by the application 14. Upon the SPT agent 40 notifying (at block 122) the host processor 4 of completing the shadow page tables 32, the host processor 4 exits (at block 124) the sequestered mode operations and returns to host operating system mode to execute the host operating system 14 and the applications 16.

Figure 4:
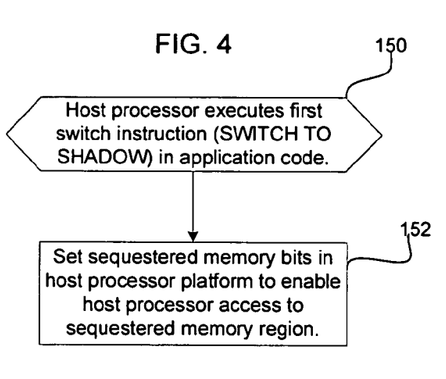
FIGS. 4, 5, and 6 illustrate operations to use the shadow page tables in the sequestered memory region for address translation.
Figure 5:
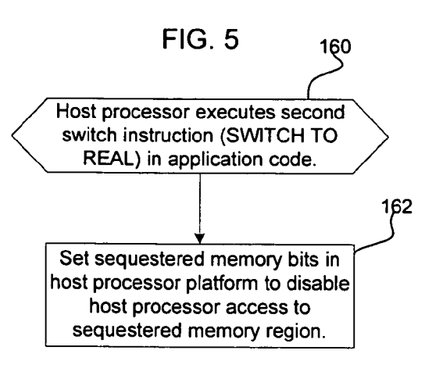
Figure 6:
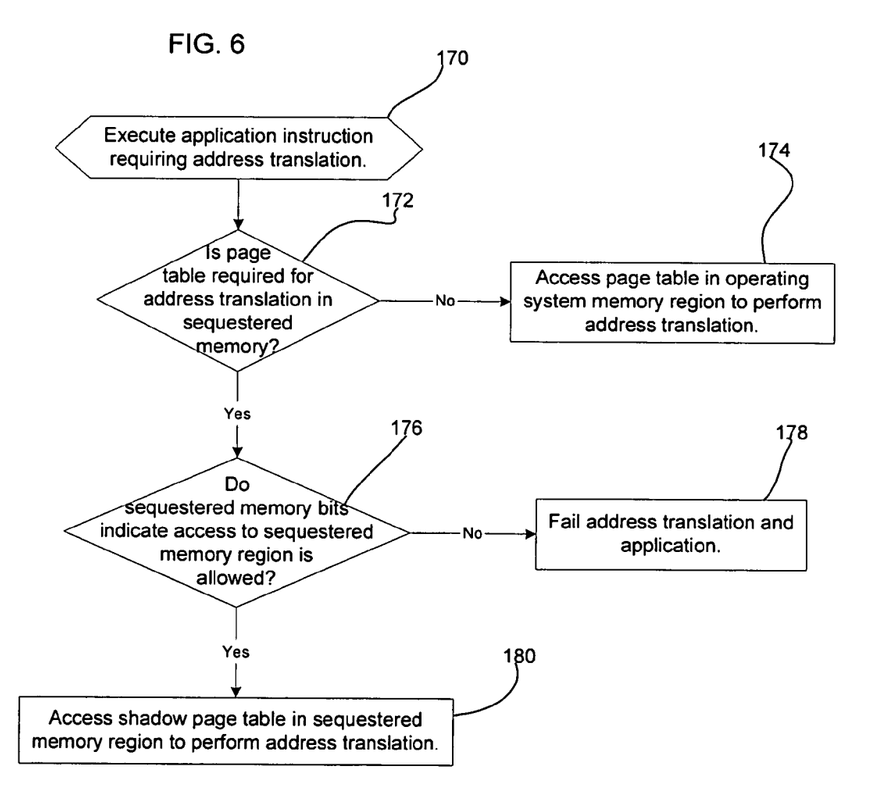

FIGS. 4, 5, and 6 illustrate an embodiment of operations implemented in the host processor microcode 24 to perform page table related operations when executing application code 18. With respect to FIG. 4, when the host processor 4 executes (at block 150) a first switch instruction (e.g., SWITCH_TO_SHADOW) in the application code 18, the host processor 4 configures (at block 152) the host processor 4 to set the sequestered memory flag 26 to enable the host processor access to the sequestered memory region 22. In certain embodiments, the host processor microcode 24 will only allow the host processor 4 access to the sequestered memory region 22 if the sequestered memory flag 26 is set to enabled. Further, the configuration of the sequestered memory flag 26 may allow the host processor read/write access to the sequestered memory region 22, or could restrict this access to read-only. Also, in certain embodiments, the host processor 4 may be allowed to perform certain privileged operations only when the sequestered memory flag 26 is set to enabled. Such operations, for example, could include writing to specific I/O ports, writing to certain memory regions, executing certain instructions, reading/modifying certain processor registers, etc. Yet further, the host processor 4 may encounter an exception when processing one switch instruction in the application if the sequestered memory region does not include one shadow page table for the application being processed.

After executing the first switch instruction, the host processor 4 accesses the shadow page tables 32 to perform address translation for application code 18 instructions between the first switch instruction and a second switch instruction (e.g., SWITCH_TO_REAL). With respect to FIG. 5, when the host processor 4 executes (at block 160) a second switch instruction (e.g., SWITCH_TO_REAL) in the application code 18, the host processor 4 configures (at block 162) the sequestered memory flag 26 to disable the host processor 4 access to the sequestered memory region 22.

FIG. 6 illustrates an embodiment of operations implemented in the host processor microcode 24 to perform address translation when executing the application code 18. Upon executing (at block 170) application code 18 instructions requiring address translation, the host processor 4 determines (at block 172) whether the page table required for address translation is a shadow page table 32 in the sequestered memory region 22. If not, then the host processor 4 accesses (at block 174) the page table 28 in the operating system 14 memory region in the host memory 12 to perform address translation for the processed instruction. Otherwise, if (at block 172) the shadow page table 32 is used for the specific address translation, then the host processor 4 determines (at block 176) whether the sequestered memory flag 26 indicates that access to the sequestered memory region 2 is allowed. If (at block 176) access is not allowed, then the address translation fails (at block 178) and the application 16 may also fail. Otherwise, if (at block 176) access to the sequestered memory region 22 is permitted, then the host processor 4 accesses (at block 180) the shadow page table 32 for the address to translate in the sequestered memory region 32 to perform address translation.

With the described embodiments of FIGS. 4, 5, and 6, malicious code cannot modify critical page tables implemented as shadow page tables 32 for a critical application 16 because the page tables required for address translation for these critical addresses comprise shadow page tables 32 in a sequestered memory region 22 that is inaccessible to the malicious code and which cannot be altered by the malicious code. For instance, once the shadow page table 32 is registered and loaded into the sequestered memory region 22 by the shadow page table agent 40, the application 16 shadow page table 32 cannot be modified to point to pages having code for the malicious application.

In certain embodiments, when the host processor 4 is executing application code 18 between the two switch statements, the host processor 4 may disable interrupts and not execute any other code other than the application code 18 between the switch statements while access to the sequestered memory region 22 is enabled until the second switch statement disables access to the sequestered memory region 22.

Figure 7:
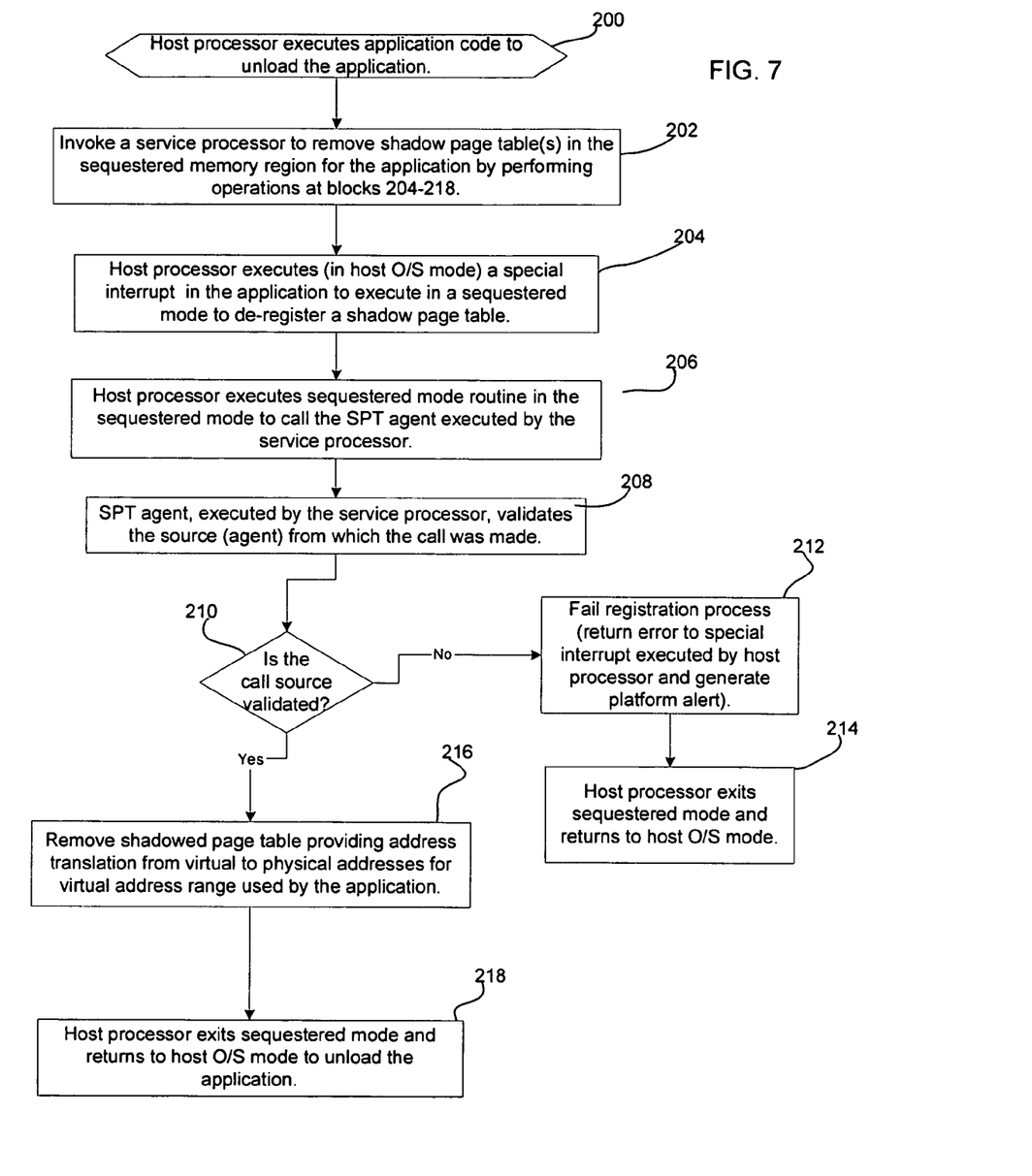
FIG. 7 illustrates an embodiment of operations to unregister a shadow page table in the sequestered memory region.

FIG. 7 illustrates an embodiment of operations performed to deregister and remove shadow page tables 32 for the application 16 from the sequestered memory region 22 when unloading the application 16 from the host memory 12. Control begins at block 200 with the host processor 4 executing the host operating system 14 to unload the application 16. The host processor 4 invokes (at block 202) a service processor 6 to remove specified shadow page table(s) 32 in the sequestered memory region 22 for the application 16. The service processor 6 may be invoked by executing application code 18 for unloading the application 16. Blocks 204 through 218 provide an embodiment of how the service processor 6 is invoked to de-register and remove shadow page tables 32. While executing the application code 18 to unload the application 16, the host processor 4 executes (at block 204) a special interrupt, such as a Service Mode Interrupt (SMI), in the application code 18 to cause the host processor 4 to execute in the sequestered mode to register a page table. As discussed, in this sequestered mode, the host processor 4 does not execute the loaded operating system 14 code (in a host operating system mode), but instead executes sequestered code 34 (to execute in the sequestered mode) which may have been loaded by the BIOS 8 into the sequestered memory region 22 during system initialization. The host processor 4 may execute a sequestered mode routine, which is part of a handler, in the sequestered mode to call (at block 206) the shadow page table (SPT) agent 40 executed by the service processor 6.

The SPT agent 40, executed by the service processor 6 validates (at block 208) the source (agent) from which the un-register call was made. To validate the source of the call, the sequestered code 34 handling the special interrupt can determine that the source of the call is from a registered agent. The sequestered code 34 for handling interrupts may consult with the service processor 6 to obtain a list of registered agents permitted to make such calls to unregister applications.

If (at block 210) the source of the call to unregister shadow page tables 32 is not validated, then the SPT agent 40 fails (at block 212) the unregistration process, which may involve returning an error to the special interrupt executed by the host processor 4 and generate a platform alert. The host processor 4 exits (at block 214) the sequestered mode in response to the returned error and returns to host operating system mode to execute the host operating system 14 code and application 16. The host processor 4 may exit the sequestered mode by executing an exit instruction.

If (at block 210) the source of the call to unregister is validated, then the SPT agent 40 removes (at block 216) the shadow page table 32 from the sequestered memory region 22. After the requested shadow page tables 32 for the application 16 are removed from the sequestered memory region 22, the host processor 4 exits (at block 218) the sequestered mode and returns to host operating system mode to execute the host operating system 14 and continue unloading the application 16.

With the described embodiment of FIG. 7, the application communicates with the SPT agent 40 to remove shadow page tables 32 from the sequestered memory region 22.

Described embodiments utilize a sequestered memory region 22 to maintain certain application page tables used for address translation to protect these shadow page tables from malicious modifications from malware executing in the operating system. Applications executing in the operating system environment are not able to access the sequestered memory region 22 to modify the references in the shadow page table 32 to point to pages of malicious code in the host memory 12, such as shown in panel 6 in FIG. 1. The shadow page tables 32 protected in the sequestered memory region 22 may include critical application code used for maintaining security in the system 2. Further, if the operating system 14 crashes, the shadow page tables 32 in the sequestered memory region 22 can be retrieved to access application memory pages 30 in the memory 14 for afterlife diagnosis.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The computer readable medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In described embodiments, the host processor entered a sequestered mode to invoke the service processor 6 to register or unregister shadow page tables in a sequestered memory region 22. In alternative embodiments, different calling methodologies may be used to allow the host processor 4 executing application code 18 to invoke the service processor 6 executing an operating system 38 independent of the host processor 4.

In described embodiments, the operating system mode and sequestered mode comprise first and second modes, respectively, in which the host processor 4 may execute. In alternative embodiments, the first and second modes may comprise other suitable processing modes known in the art.

In described embodiments, a switch statement was inserted in the application code 18 to configure sequestered memory flag 26 to enable the host processor 4 to access a shadow page table 32 in a sequestered memory region 22. In an alternative embodiment, different techniques may be used to grant the host processor 4 access to the sequestered memory region 22 to access the shadow page tables 32 for address translation with respect to critical pages 30 in the host memory 12.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or that a different number of devices may be used than the multiple number shown.

The functionality and/or the features of a device may be alternatively embodied by one or more other devices which are not explicitly described as having such functionality/features. Thus, other embodiments of the present invention need not include the device itself.

The illustrated operations of FIGS. 3, 4, 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

invoking, by a first processor executing a first operating system and an application, a second processor, executing a second operating system, to create a shadow page table used for address translation for the application, wherein the shadow page table is implemented in a sequestered memory region non-alterable by processes controlled by the first operating system and accessible to processes executed by the second operating system, wherein the shadow page table provides address translation from virtual to physical addresses in memory pages accessible to the first operating system used by the application;

validating, by the second processor, the application to determine whether the application is acceptable in response to being invoked to create the shadow page table; and creating, by the second processor, the requested shadow page table in the sequestered memory region for address translation for the memory pages accessible to the application and the first operating system in response to determining that the application is acceptable, wherein the first processor accesses the shadow page table in the sequestered memory region to perform address translation.

2. The method of claim 1, wherein invoking the second processor to create the shadow page table further comprises:

executing code in the application, by the first processor, to register a shadow page table, wherein the second processor is invoked in response to executing the code to register the shadow page table, wherein the application is validated by an agent executed by the second processor, wherein the shadow page table is created by the agent in response to validating the application.

3. The method of claim 1, wherein invoking the second processor to create the shadow page table comprises:

executing an interrupt to cause the first processor to execute code associated with the sequestered memory region; and calling, by the first processor executing the code associated with the sequestered memory region, an agent executed by the second processor to create the shadow page table in the sequestered memory.

4. The method of claim 1, wherein the application includes a first switch instruction and a second switch instruction and wherein the first processor performs address translation for application instructions between the first and second switch instructions by accessing the shadow page table in the sequestered memory region.

5. The method of claim 4, wherein the first processor is capable of performing privileged operations between the first and second switch instructions that are not allowed outside the scope of the two switch instructions.

6. The method of claim 4, wherein the first processor encounters an exception when processing one switch instruction in the application if the sequestered memory region does not include one shadow page table for the application being processed.

7. The method of claim 4, wherein further comprising:

disabling interrupts when executing code between the first and second switch instructions.

8. The method of claim 4, wherein accessing the shadow page table to perform address translation comprises:

executing, by the first processor, the first switch instruction in the application to configure the first processor to enable the first processor access to the sequestered memory region;

accessing, by the first processor, the shadow page table to perform address translation when executing application instructions between the first and second switch instructions; and executing, by the first processor the second switch instruction in the application to configure the first processor to disable the first processor access to the sequestered memory region.

9. The method of claim 4, wherein shadow page tables are created in the sequestered memory region for a first set of page tables for the application referencing pages in the operating system memory region, further comprising:

creating a second set of page tables for the application in the operating system memory region referencing pages in the operating system memory region and used for address translation, wherein the first processor performs address translation for application instructions not between the first and second switch instructions by accessing the second set of page tables in the operating system memory region.

10. The method of claim 1, further comprising:

invoking the second processor to unload the shadow page table for the application in the sequestered memory region; and unloading the application from the operating system environment in response to unloading the shadow page table to prevent further application operations.

11. A device in communication with at least one memory device including an operating system and application, comprising:

a first processor executing a first operating system and an application;

a second processor executing a second operating system;

microcode executed to perform operations, the operations comprising:

configuring an operating system memory region and sequestered memory region in the at least one memory device, wherein the sequestered memory region is non-alterable by processes controlled by the operating system executed by the first processor;

invoking, by the first processor, the second processor to create a shadow page table used for address translation for the application, wherein the shadow page table is implemented in the sequestered memory region, wherein the shadow page table provides address translation from virtual to physical addresses in memory pages accessible to the first operating system used by the application;

validating, by the second processor, the application to determine whether the application is acceptable in response to being invoked to create the shadow page table; and creating, by the second processor, the requested shadow page table in the sequestered memory region for address translation for the memory pages accessible to the application and the first operating system in response to determining that the application is acceptable, wherein the first processor accesses the shadow page table in the sequestered memory region to perform address translation.

12. The device of claim 11, further comprising a central processing unit, wherein the first and second processors comprise virtual processors implemented in the central processing unit.

13. The device of claim 11, further comprising:
a central processing unit implementing the first processor; and
a chip set implementing the second processing unit.

14. The device of claim 11, wherein invoking the second processor to create the shadow page table further comprises:
executing code in the application, by the first processor, to register a shadow page table, wherein the second processor is invoked in response to executing the code to register the shadow page table, wherein the application is validated by an agent executed by the second processor, wherein the shadow page table is created by the agent in response to validating the application.

15. The device of claim 11, wherein the application includes a first switch instruction and a second switch instruction and wherein the first processor performs address translation for application instructions between the first and second switch instructions by accessing the shadow page table in the sequestered memory region.

16. The device of claim 15, wherein shadow page tables are created in the sequestered memory region for a first set of page tables for the application referencing pages in the operating system memory region, wherein the operations further comprise:
creating a second set of page tables for the application in the operating system memory region referencing pages in the operating system memory region and used for address translation, wherein the first processor performs address translation for application instructions not between the first and second switch instructions by accessing the second set of page tables in the operating system memory region.

17. A system, comprising:
a central processing unit implementing a first processor executing a first operating system;
a chip set implementing a second processor executing a second operating system;
at least one memory device, wherein the first and second processor are in communication with the at least one memory device, wherein the at least one memory device is configured to include:
an operating system memory region including the first operating system and an application executed by the first processor;
a sequestered memory region non-alterable by processes controlled by the operating system executed by the first processor;
microcode executed to perform operations, the operations comprising:
invoking, by the first processor, the second processor to create a shadow page table used for address translation for the application, wherein the shadow page table is implemented in the sequestered memory region, wherein the shadow page table provides address translation from virtual to physical addresses in memory pages accessible to the first operating system used by the application references at least one page in the operating system memory region accessible to processes controlled by the operating system;
validating, by the second processor, the application to determine whether the application is acceptable in response to being invoked to create the shadow page table; and
creating, by the second processor, the requested shadow page table in the sequestered memory region for address translation for the memory pages accessible to the application and the first operating system in response to determining that the application is acceptable, wherein the first processor accesses the shadow page table in the sequestered memory region to perform address translation.

18. An article of manufacture comprising a computer readable storage medium including code executed by a first processor or second processor in communication with at least one memory device, wherein the first processor executes an operating system and application, wherein the code is executed to perform operations, the operations comprising:
configuring an operating system memory region and sequestered memory region in the at least one memory device, wherein the sequestered memory region is non-alterable by processes controlled by the operating system executed by the first processor; and
invoking, by the first processor executing the application, the second processor to create a shadow page table used for address translation for the application in the sequestered memory region non-alterable by processes controlled by the operating system executed by the first processor, wherein the shadow page table references at least one page in the operating system memory region accessible to processes controlled by the operating system;
validating, by the second processor, the application to determine whether the application is acceptable in response to being invoked to create the shadow page table; and
creating, by the second processor, the requested shadow page table for address translation for the application in response to determining that the application is acceptable.

19. The article of manufacture of claim 18, wherein the operations further comprise:
accessing the shadow page table in the sequestered memory region to perform address translation for the application.

20. The article of manufacture of claim 18, wherein invoking the second processor to create the shadow page table further comprises:
executing code in the application, by the first processor, to register a shadow page table, wherein the second processor is invoked in response to executing the code to register the shadow page table, wherein the application is validated by an agent executed by the second processor, wherein the shadow page table is created by the agent in response to validating the application.

21. The article of manufacture of claim 18, wherein invoking the second processor to create the shadow page table comprises:
executing an interrupt to cause the first processor to execute code associated with the sequestered memory region; and
calling, by the first processor executing the code associated with the sequestered memory region, an agent executed by the second processor to create the shadow page table in the sequestered memory.

22. The article of manufacture of claim 18, wherein the application includes a first switch instruction and a second switch instruction and wherein the first processor performs address translation for application instructions between the first and second switch instructions by accessing the shadow page table in the sequestered memory region.

23. The article of manufacture of claim 22, wherein the first processor is capable of performing privileged operations between the first and second switch instructions that are not allowed outside the scope of the two switch instructions.

24. The article of manufacture of claim 22, wherein the first processor encounters an exception when processing one switch instruction in the application if the sequestered memory region does not include one shadow page table for the application being processed.

25. The article of manufacture of claim 22, wherein the operations further comprise:
disabling interrupts when executing code between the first and second switch instructions.

26. The article of manufacture of claim 22, wherein accessing the shadow page table to perform address translation comprises:
executing, by the first processor, the first switch instruction in the application to configure the first processor to enable the first processor access to the sequestered memory region;
accessing, by the first processor, the shadow page table to perform address translation when executing application instructions between the first and second switch instructions; and
executing, by the first processor the second switch instruction in the application to configure the first processor to disable the first processor access to the sequestered memory region.

27. The article of manufacture of claim 22, wherein shadow page tables are created in the sequestered memory region for a first set of page tables for the application referencing pages in the operating system memory region, wherein the operations further comprise:
creating a second set of page tables for the application in the operating system memory region referencing pages in the operating system memory region and used for address translation, wherein the first processor performs address translation for application instructions not between the first and second switch instructions by accessing the second set of page tables in the operating system memory region.

28. The article of manufacture of claim 18, wherein the operations further comprise:
invoking the second processor to unload the shadow page table for the application in the sequestered memory region; and
unloading the application from the operating system environment in response to unloading the shadow page table to prevent further application operations.

* * * * *